United States Patent [19]

Okamoto

[11] 4,406,316
[45] Sep. 27, 1983

[54] WHEEL AND LOW AIR PRESSURE TIRE COMBINATION

[75] Inventor: Satoru Okamoto, Kodaira, Japan

[73] Assignee: Bridgestone Tire Company Limited, Tokyo, Japan

[21] Appl. No.: 333,359

[22] Filed: Dec. 22, 1981

Related U.S. Application Data

[63] Continuation of Ser. No. 149,592, May 13, 1980, abandoned.

[30] Foreign Application Priority Data

Jun. 16, 1979 [JP] Japan .................................. 54-75164

[51] Int. Cl.³ .................... B60C 15/00; B60C 5/00; B60C 11/00
[52] U.S. Cl. ........................... 152/209 R; 152/330 R; 152/362 R; 152/386; 152/398; 152/406
[58] Field of Search ............... 152/406, 411, 407, 408, 152/409, 410, 401, 405, 381.3, 381.4, 386, 398, 330 R, 374, 209 R, 209 A, 209 B, 209 NT, 209 WT, 209 D, 362 R, 352 R, 353 R, 353 C, DIG. 5; 56/322

[56] References Cited

U.S. PATENT DOCUMENTS

| | | | |
|---|---|---|---|
| 2,720,240 | 10/1955 | Bourdon | 152/406 |
| 2,859,792 | 11/1958 | Patin | 152/406 |
| 2,948,568 | 8/1960 | Hykes et al. | 152/406 X |
| 3,548,913 | 12/1970 | Gerbeth | 152/406 |
| 3,915,214 | 10/1975 | Pile et al. | 152/406 X |
| 4,186,788 | 2/1980 | Pommier | 152/209 B |
| 4,190,092 | 2/1980 | Evans et al. | 152/381.4 |
| 4,217,943 | 8/1980 | Tsuzura | 152/209 B |

Primary Examiner—William A. Powell
Assistant Examiner—Thomas Bokan
Attorney, Agent, or Firm—Sughrue, Mion, Zinn, Macpeak and Seas

[57] ABSTRACT

A wheel for a low air pressure tire suitable for use in agricultural machines such as a binder and comprising a rim portion including a pair of bead seats and a disc portion made integral with the rim portion. Each of the bead seats is provided at its inside with a ridge. The bead portions of the tire are engaged with the bead seats and firmly secured between a fixed flange formed at the outside of one of the bead seats and the ridge on the one hand and between a flange ring engaged with an annular groove and provided along its periphery with a slit and the ridge on the other hand.

4 Claims, 4 Drawing Figures

WHEEL AND LOW AIR PRESSURE TIRE COMBINATION

This is a continuation of application Ser. No. 149,592, filed May 13, 1980 now abandoned.

BACKGROUND OF THE INVENTION

1. Field of the Invention

This invention relates to wheels for low air pressure tires and more particularly to a wheel for low air pressure tire and eventually no air pressure tire, which is suitable for use in agricultural machines such as a binder.

2. Description of the Prior Art

A low air pressure tire or no air pressure tire, for example, is a pneumatic tire for a binder which comprises a tread portion which is considerably high in rigidity and bead portions which are difficult to deform. As a result, it is substantially impossible to mount such kind of pneumatic tire on a rim portion made integral with a disc portion of the wheel. Heretofore, it has been the common practice to divide a wheel along its axial direction into two portions and to firmly fasten these two divided portions with a tire and packing sandwiched therebetween by means of bolts and nuts.

The use of the wheel constructed as above described provides disadvantages in that the number of parts increases and hence degrade the mounting efficiency and increase the material cost. Also, when the wheel runs along the curved or inclined course there is a risk of the bead portions being detached from the rim portion of the wheel.

SUMMARY OF THE INVENTION

An object of the invention, therefore, is to provide a wheel for low air pressure tire which can effectively eliminate the above mentioned drawbacks which have been encountered with the prior art techniques.

A feature of the invention is the provision in a wheel for low air pressure tire comprising a rim portion including a pair of bead seats and a disc portion made integral with said rim portion. The improvement comprises a ridge arranged at the inside of each of said bead seats, and a fixed flange formed at the outside of one of said bead seats. An annular groove is formed outside the other bead seat, an annular depression is located between said ridges and has a depth which is larger than the height of said fixed flange and a width which is wider than the total sum of the widths of the beads of the tire; and a flange ring is engaged with said annular groove and provided along its periphery with a slit.

Further objects and features of the invention will be fully understood from the following detailed description with reference to the accompanying drawings, wherein:

DETAILED DESCRIPTION OF THE PREFERRED EMBODIMENTS

Figure 1:
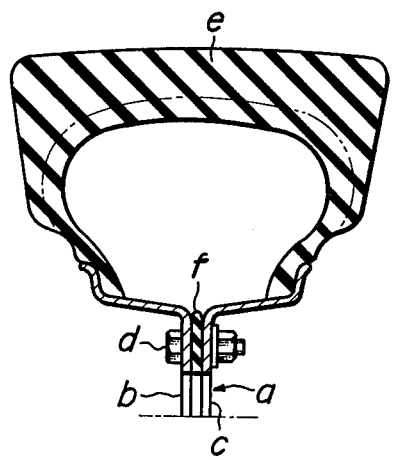
FIG. 1 is a cross-sectional view of a conventional wheel for low air pressure tire.

FIG. 1 shows a conventional wheel for low air pressure tire comprising a wheel a divided in its axial direction into two portions b and c. Between these two divided portions b and c are sandwiched a tire e and packing f by means of bolts and nuts d, thereby mounting the tire e on the wheel.

Figure 2:
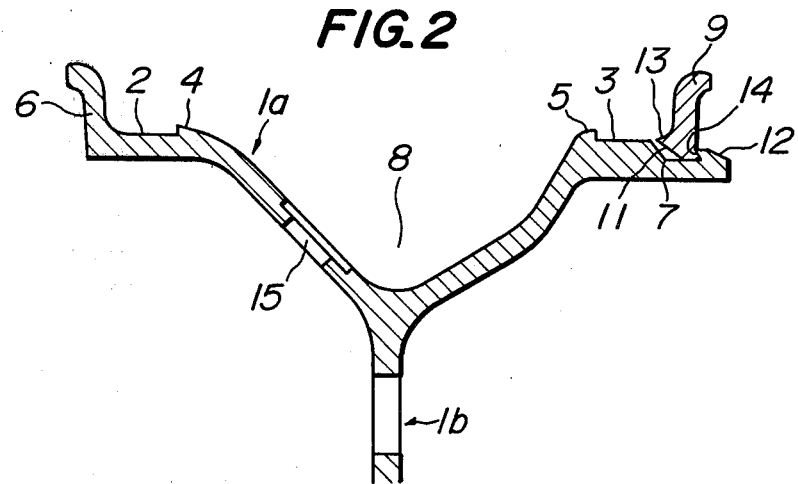
FIG. 2 is a cross-sectional view of essential parts of one embodiment of a wheel for low air pressure tire according to the invention.

FIG. 2 shows essential parts of one embodiment of a wheel for low air pressure tire according to the invention. In FIG. 2, 1a designates a rim portion and 1b a disc portion made integral with the rim portion 1a.

The rim portion 1a is formed, for example, of plastics, cast iron or the like and provided at its side portions with a pair of bead seats 2, 3. There bead seats 2, 3 are provided at the inside thereof with ridges 4, 5, respectively. One of the bead seats 2 is provided at its outside with a fixed flange 6 and the other bead seat 3 is provided at its outside with an annular groove 7. Between the ridges 4, 5 is formed an annular depression 8.

It is preferable to make the ridges 4, 5 annular in shape and the side surfaces of the ridges 4, 5 facing the bead seats are inclined at or substantially right angles to the bead seats for the purpose of more positively preventing the bead portions from detaching from the rim portion. The annular depression 8 functions to temporarily locate the bead portions of the tire therein. In order to easily mount the bead portions of the tire on the rim, it is necessary that the annular depression 8 has a depth which is larger than the height of the fixed flange 6 and a width which is wider than the total sum of the widths of the bead portions of the tire. If the annular depression 8 is located as near as possible to the ridges 4, 5, the mounting of the bead portions of the tire on the rim becomes more easy.

Figure 3:
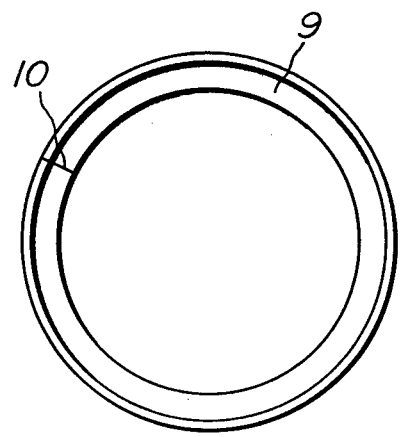
FIG. 3 is a front view of a flange ring shown in FIG. 2.

FIG. 3 shows a flange ring 9. The flange ring 9 is engaged with the annular groove 7 and provided along its periphery with a slit 10. If the diameter of the flange ring 9 is enlarged by opening the slit 10, the flange ring 9 can easily be engaged with the annular groove 7.

The flange ring 9 is provided at its inner peripheral surface with a tapered portion 11 whose diameter becomes gradually enlarged toward the inside of the bead seat 3. The tapered portion 11 functions to easily engage the flange ring 9 with the annular groove 7 after the tire has been mounted on the rim portion 1a. If the end surface 12 of the rim portion 1a located outside the bead seat 3 is made tapered or round, the flange ring 9 can be engaged with the annular groove 7 in an easier manner.

In FIG. 2, reference numeral 13 designates a projection facing toward the inside of the bead seat 3 and having a front end aligned with the bead seat in the same plane. The projection 13 is not the essential constructional feature of the invention, but in the case of mounting the bead portion on the rim portion 1a if the bead portion is engaged with both the bead seat 3 and the projection 13, it is possible to prevent the flange ring 9 from detaching from the annular groove 7 when the diameter of the flange ring 9 becomes enlarged after the tire has been mounted on the rim.

In addition, if the outside wall 14 of the annular groove 7 is inclined inwardly with respect to the base surface of the annular groove 7 and the flange ring 9 is provided at its inner periphery with an inclined portion corresponding to the inclination of the outside wall 14 of the annular groove 7, it is possible to prevent the flange ring 9 from detaching from the annular groove 7 when the diameter of the flange ring 9 becomes enlarged after the tire has been mounted on the rim.

Figure 4:
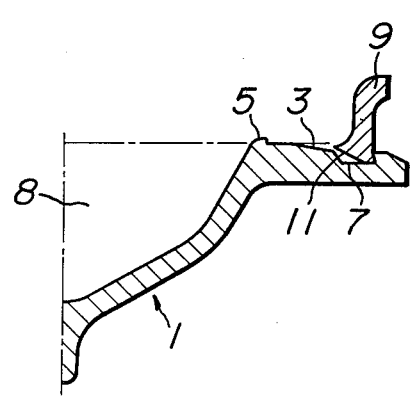
FIG. 4 is a cross-sectional view of essential parts of a modified embodiment of a wheel for low air pressure tire according to the invention.

FIG. 4 shows a modified embodiment of a wheel for a low air pressure tire according to the invention. In the present embodiment, the bead seat 3 is gradually reduced in diameter toward the outside thereof so as to make the manner of engaging the tire with the rim portion 1a easy and to prevent the tire from detaching from the rim portion 1a after the tire has been mounted on the rim. That is, if the tire runs under load and the sidewall of the tire becomes bent, the bead portion tends to be pivoted around the upper end of the flange ring 9 to displace the bead portion toward the inside of the wheel. As a result, the bead portion tends to be easily detached from the rim. But, if the bead seat 3 is gradually reduced in diameter toward the outside thereof, it is possible to prevent the above described displacement of the bead portion toward the inside of the wheel.

In the case of mounting the tire on the wheel constructed as above described, in the first place, one of the bead portions is located in the annular depression 8 and then the other bead portion is pushed onto the bead seat 3.

It is a matter of course that the other bead portion may easily be pushed onto the bead seat 3 by means of a jig. The use of the inclined bead seat 3 shown in FIG. 4 also ensures an easy engagement of the bead portion with the bead seat 3.

After the tire has completely been mounted on the rim portion, the flange ring 9 is brought into engagement with the annular groove 7. Finally, air is introduced into the tire through a valve hole 15 to locate both the bead portions on the bead seats 2, 3, respectively, and preferably located one of the bead portions on both the bead seat 3 and the projection 13 in a precise manner.

After the tire has been mounted on the rim, the ridges 4, 5 eventually together with the inclined bead seat 3 can prevent the bead portions from detaching from the rim portions.

As stated hereinbefore, the wheel according to the invention is capable of mounting a low pressure tire having a high rigidity on a rim in an extremely easy manner, reducing the number of parts and thereby making less expensive, and positively preventing the bead portions from detaching from the rim portion when the wheel is in use.

What is claimed is:

1. In combination, a wheel having a rim portion and a low air pressure tire having a tread portion of extremely high rigidity and having substantially undeformable bead portions seated on said rim portion; said wheel rim portion including a pair of bead seats and a disc portion made integral with said rim portion; a ridge arranged at the inside of each of said bead seats and having a side surface substantially perpendicular to said bead seat, a fixed flange formed at the outside of one of said bead seats, an annular groove formed at the other seat, an annular depression located between said ridges and having a depth which is larger than the height of said fixed flange and a width which is wider than the total sum of the widths of the beads of said tire, a flange ring engaged with said annular groove and provided along at its periphery with a slit, and wherein the bead seat adjacent to said annular groove is gradually reduced in diameter toward the outside of the bead seat.

2. The wheel and low air pressure tire according to claim 1, wherein said flange ring is provided with a projection facing toward the inside of the bead seat, the front end of said projection being aligned with said bead seat in the same or substantially the same plane.

3. The wheel and low air pressure tire according to claims 1 or 2 wherein the portion of said flange ring engaging the annular groove is tapered to gradually enlarge toward the inside of said bead seat to facilitate engagement of said flange ring on said annular groove after said tire has been mounted on said rim portion.

4. The wheel and low air pressure tire according to claim 1 wherein said slit is a butt joint normally closing said slit when said flange ring is engaged with said annular groove.

* * * * *